United States Patent [19]
Templeton et al.

[11] Patent Number: 5,634,525
[45] Date of Patent: Jun. 3, 1997

[54] SPLIT ENGINE HOOD FOR TRACTORS

[75] Inventors: David J. Templeton, New Holland, Pa.; Russell W. Strong, Craftsbury Common, Vt.; Robert D. Kurtz, Jr., Leola, Pa.; Joseph C. Hurlburt, Lancaster, Pa.; David L. Knight, Lititz, Pa.

[73] Assignee: New Holland North America, Inc., New Holland, Pa.

[21] Appl. No.: 318,303

[22] Filed: Oct. 5, 1994

[51] Int. Cl.$^6$ ................................................. B62D 25/12
[52] U.S. Cl. ............................................................. 180/69.24
[58] Field of Search ................................ 180/69.2, 69.21, 180/69.22, 69.24, 69.23

[56] References Cited

U.S. PATENT DOCUMENTS

| | | | |
|---|---|---|---|
| 3,266,590 | 8/1966 | Hungerford | 180/69.2 |
| 3,982,600 | 9/1976 | Gerresheim et al. | 180/69.21 |
| 4,889,203 | 12/1989 | Hagarty | 180/69.24 |
| 5,193,636 | 3/1993 | Holm | 180/69.21 |
| 5,495,910 | 3/1996 | Stauffer et al. | 180/69.2 |

FOREIGN PATENT DOCUMENTS

| | | | |
|---|---|---|---|
| 764143 | 5/1934 | France | 180/69.24 |
| 448394 | 6/1936 | United Kingdom | 180/69.21 |

*Primary Examiner*—Richard M. Camby
*Assistant Examiner*—Frank Vanaman
*Attorney, Agent, or Firm*—Larry W. Miller; Frank A. Seemar; John W. Stader

[57] ABSTRACT

A rear hinged pivotable hood for enclosing a tractor engine is disclosed wherein a hinge member pivotally mounts the hood to the tractor chassis for movement about a generally horizontal, transverse hinge access between a closed position in which the engine is inaccessibly covered and an opened position in which the engine is accessible. The engine hood includes a primary hood member that is pivotally movable about the hinge axis and a fixed portion that includes a pair of laterally spaced daily access doors pivotally mounted for outward movement to gain access to preselected frequently accessed service components of the engine. The lateral width of the primary hood member is substantially greater that the lateral spacing of the daily access doors so that the operator may have greater visibility of the position where said front tires engage the ground.

14 Claims, 7 Drawing Sheets

SPLIT ENGINE HOOD FOR TRACTORS

BACKGROUND OF THE INVENTION

This invention relates generally to off-road motor vehicles, such as tractors, and more particularly, to an engine hood enclosure for the tractor engine in which the hood is rearwardly pivotable and closes against a radiator structure.

Tractors, particularly tractors used in an agricultural environment, are typically provided with a hood enclosure that has pivotable parts to provide access to the engine for service thereof. Generally, tractor hoods do not utilize engine hoods that pivotally move as an entire unit to provide access to the tractor engine; however, one piece hood configurations can be more economically produced.

In known engine hood configurations, access for daily maintenance components is attained merely by lifting or removing a side panel of the engine hood. Furthermore, raising the hood to fully expose the engine subjects the hood to wind forces, while daily maintenance, such as oil level checking, etc., can be accomplished without fully raising the hood relative to the engine. Accordingly, it would be desirable to provide a rear hinged engine hood for a tractor in which the hood is pivotable in an upwardly and rearwardly direction and in which the hood is positionable in at least one intermediate position and further desirable to provide a mechanism to permit daily maintenance without requiring the raising of the hood.

Economical manufacture of a one piece engine hood enclosure is a desirable goal. One piece polymer hoods have the advantage of being molded in an aesthetically pleasing shape; however, certain manufacturing processes require the hood to have substantially uniform material thicknesses to accomplish a high gloss exterior finish and minimize tooling costs. Since a one piece, rear hinged hood closes against the radiator structure from a generally vertical direction, a corresponding sealing apparatus between the hood and the radiator would be desirable.

For proper engine cooling, the air gap between the radiator and the hood must be sealed to prevent hot air from recirculating from the engine compartment back through the radiator. For known hood assemblies in which the hood structure does not move relative to the radiator for routine servicing of the engine, a strip of pressure sensitive, adhesive-attached closed cell foam is installed between the radiator and hood with little durability problems. When such closed cell foam is utilized in conditions under which the adjacent hood panels are moved relative to the seal for servicing, the seal often is subject to damage from environmental heat, chemical contamination and operator contact. This sealing problem is more troublesome when the radiator structure against which the hood is to be sealed is provided with irregularly shaped surfaces.

For a rear hinged hood structure that requires frequent movement for servicing the engine, the seals must be wear, chemical, temperature and peel resistant. Furthermore, the required closure against a radiator injects a temperature differential problem where the left inner cooler tube can reach temperatures of approximately 325°, while the right cooler tube may only reach a temperature of 170°. The top of the radiator tank usually has an intermittent temperature reaching a high of about 250°. Such a seal must be soft and easily compressed so that the forces to effect hood closure and latching are not excessive.

The shape of the hood provides an opportunity to improve visibility to the area of the ground inside of the front tires to improve the operation of the tractor when performing row crop work. A simple narrowing of the one piece hood along the sight line of the operator restricts the effective width of the engine compartment so that the hood can be raised vertically to service the engine. Such restrictions, however, are unacceptable, as large tractors require large engines and the hood must be adapted to the engine compartment.

Furthermore, the utilization of a one piece hood requires a vertical raising of the hood for servicing the engine. Daily servicing would be best achieved without requiring any vertical movement of the hood; however, the raising of the hood to access the engine and/or radiator structure requires sufficient vertical movement that the entire hood structure clears the engine compartment to permit open access thereto.

SUMMARY OF THE INVENTION

It is an object of this invention to overcome the aforementioned disadvantages of the prior art by providing a one piece polymer hood to enclose the engine compartment of a tractor.

It is another object of this invention to provide a hood design in which the sight line of the operator is used to define a line of partitioning of the hood structure.

It is still another object of this invention to provide a daily maintenance access door for access to the engine compartment without requiring movement of the primary hood structure.

It is a feature of this invention that the daily access doors provide a convenient access to the engine compartment for frequent servicing operations.

It is another feature of this invention that the one piece hood structure requiring clearance of the engine compartment terminates along the sight line of the operator.

It is still another feature of this invention that the operator sight line provides a partition line between the wide primary hood structure and the narrowly spaced daily access doors.

It is an advantage of this invention that the relatively narrow lateral separation of the daily access doors provides improved visibility to the inside of the front tires to facilitate operation of the tractor in row crops.

It is another advantage of this invention that the vertical movement of the hood clears the engine compartment without restricting the visibility of the ground along a path below the operator sight line.

It is still another advantage of this invention that the daily access doors are hinged to the tractor chassis independently of the rearwardly hinged primary hood structure.

It is still another advantage of this invention that the primary hood structure is vertically movable to a position at which the normally diagonally extending line of partitioning between the hood structure and the daily access doors is re-positioned in a generally horizontal orientation to provide full access to the engine compartment.

It is still another advantage of this invention that the termination of the primary hood structure along the diagonally extending operator sight line permits the hood to be swung through a more limited angular rotation to move the hood to a position in which the hood completely clears the engine compartment.

It is yet another feature of this invention that the relatively narrow lateral spacing of the daily access doors provides greater clearance for the front tires during a maximum turn to assist the provision of a minimum turning radius.

It is yet another object of this invention to provide a hood structure and daily access door apparatus for a tractor which is durable in construction, inexpensive of manufacture, carefree of maintenance, facile in assemblage, and simple and effective in use.

It is a further object of this invention to provide a sealing apparatus between a rearwardly hinged hood member and a forwardly positioned radiator mechanism.

It is yet another feature of this invention that the seals are functional with a vertically movable hood structure to prevent a re-circulation of hot air from the engine compartment forwardly of the radiator.

It is a further advantage of this invention that the seals are durable, resilient, resistent to wear, chemicals and heat.

It is a further feature of this invention that the top closed cell foam seal is placed into compression when the hood is closed.

It is still a further advantage of this invention that the top radiator seal by being placed into compression is subjected to minimum peeling forces to separate the adhesive attachment of the seal to the hood structure.

It is still a further feature of this invention that the top radiator seal is operable against the irregularly shaped surface of the radiator and an engine air scoop.

It is still a further feature of this invention that the seals between the lateral sides of the radiator and the hood structure are non-foam, resilient flapper seals that are compressed against the hood structure when placed in the closed position.

It is yet a further advantage of this invention that the radiator side seal is deflected by the hood structure when moved to the closed position to be compressed against the hood structure and prevents hot air from recirculating from the engine compartment forwardly of the radiator.

It is yet a further advantage of this invention that the negative air pressure created by the engine fan drawing air through the radiator further compresses the side seals against the hood structure.

It is yet a further feature of this invention that the side seals are fastened to the radiator structure to remain fixed in place when the hood is raised to an opened position.

It is yet a further advantage of this invention that the radiator side seals are not prone to being attached by the movements of the hood structure.

It is still a further object of this invention to provide a sealing apparatus between the hood structure and the radiator structure of a tractor, which is durable in construction, inexpensive manufacture, carefree of maintenance, facile in assemblage, and simple and effective in use.

These and other objects, features, and advantages are accomplished according to the instant invention by providing a rear hinged pivotable hood for enclosing a tractor engine wherein a hinge member pivotally mounts the hood in to the tractor chassis for movement about a generally horizontal, transverse hinge axis between a closed position in which the engine is inaccessibly covered and an opened position in which the engine is accessible. The engine hood includes a primary hood member that is pivotally movable about the hinge axis and a fixed portion that includes a pair of laterally spaced daily access doors pivotally mounted for outward movement to gain access to preselected frequently accessed service components of the engine. The lateral width of the primary hood member is substantially greater that the lateral spacing of the daily access doors so that the operator may have greater visibility of the position where said front tires engage the ground.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
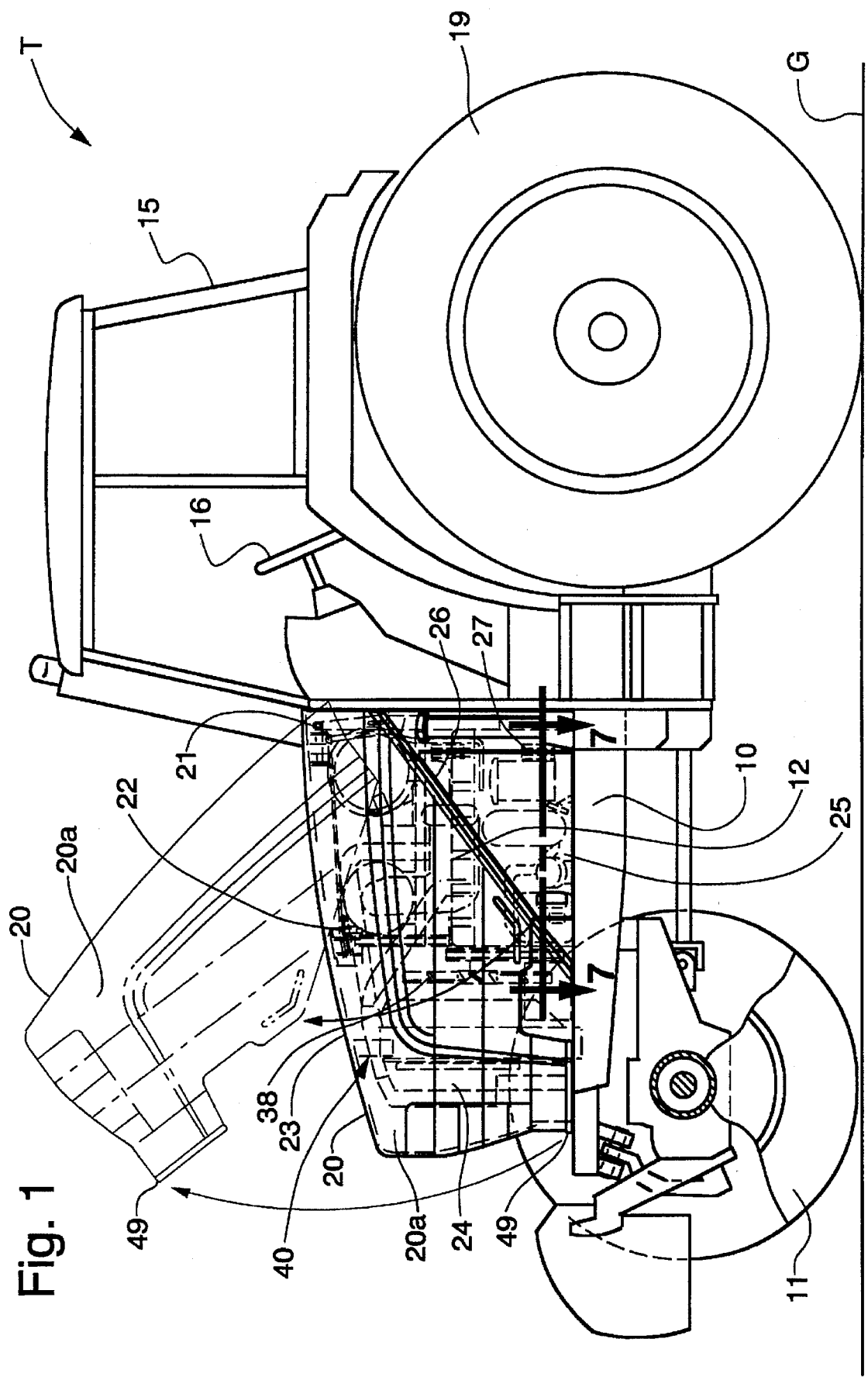
FIG. 1 is a side elevational view of a tractor incorporating the principles of the instant invention, the left front tire being broken away to better view the invention and the pivotal movement of the hood structure being shown in phantom.

Referring now to the drawings and, particularly, to FIGS. 1–4, a representative view of an agricultural tractor incorporating the principles of the instant invention can best be seen. Left and right references are used as a matter of convenience and are determined by standing at the rear of the tractor and facing the forward end in the normal direction of travel. The tractor chassis 10 houses a conventional engine 12 serving to provide operational power for the tractor T and an operator's cab 15 positioned in an elevated location. The operator's cab 15 includes a steering wheel 16, positioned forwardly of the conventional operator's seat 17, to operate the steering of the front wheels 11 in a known manner. The chassis 10 is supported above the ground G in a conventional manner by forward steerable wheels 11 and rearward drive wheels 19 rotatably mounted in a customary transversely spaced orientation.

The hood 20 is mounted on the chassis 10 forwardly of the operator's cab 15 to enclose the engine 12. The hood 20 is pivotally mounted by a hinge mechanism 21 defining a generally horizontal, transverse hinge axis positioned next to the operator's cab 15 to enable the hood 20 to move upward and rearwardly toward the operator's cab 15. The apparatus for pivotally supporting and controlling the pivotal movement of the hood 20 are found in U.S. patent application Ser. No. 08/302,457, by R. D. Kurtz, Jr. and D. B. Stauffer, entitled "Rearwardly Pivotable Tractor Hood", filed on Sep. 9, 1994, now abandoned, the descriptive portions of which are incorporated herein by reference. A latching mechanism 22 retains the hood 20 in its closed position completely enclosing the engine 12.

The hood 20 has a contoured surface to provide a pleasing aesthetic appearance and excellent visibility. The top portion 23 of the hood 20 is manufactured preferably from a polymer such as fiberglass reinforced polyester with directed fiber preform by a process referred to as liquid composite molding, which provides a high gloss finish, but does not permit the incorporation of mounting bosses. The thickness of the material is approximately 4 millimeters. The side panels 24 are also preferably manufactured from fiberglass reinforced polyester by a manufacturing process referred to as sheet molding compound, which allow for the incorporation of mounting bosses. The side panels 24 are bonded to the top portion 23 by high tech, heat cured adhesives to form a one-piece hood structure. As a result, the hood 20 can be pre-formed from polymer material with a relatively uniform thickness to provide a low cost hood 20 with satisfactory strength characteristics and a high gloss exterior finish.

Because of the overall size of the hood 20, the amount of pivotal movement of the hood 20 about the hinge mechanism 21 required to fully expose the engine 12 to access by the operator is quite substantial. While a fully opened hood 20 is necessary for some maintenance or repair of the engine 12, normal daily maintenance generally requires only a partial opening of the hood 20 to an intermediate opened position. Pivotal movement of the hood 20 to an intermediate opened position also minimizes the exposure of the hood 20 to the wind or other external forces. Daily maintenance service can be accomplished through triangular daily access doors 25, which can be opened for appropriate access to the engine compartment without pivotally moving the primary hood structure 20a.

Figure 2:
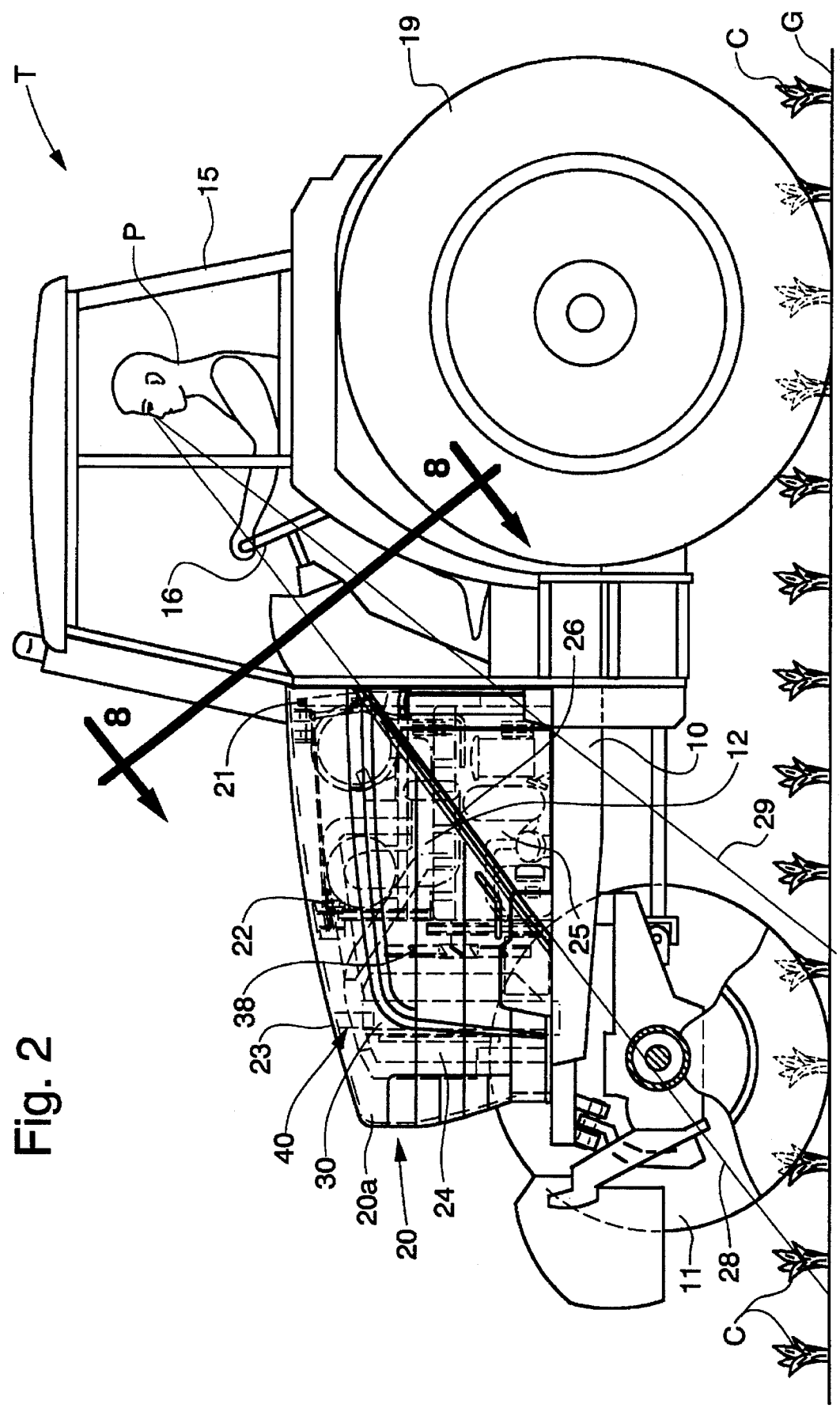
FIG. 2 is a side elevational view of the tractor of FIG. 1 operating in row crops, the sight line of the operator being depicted.
Figure 3:
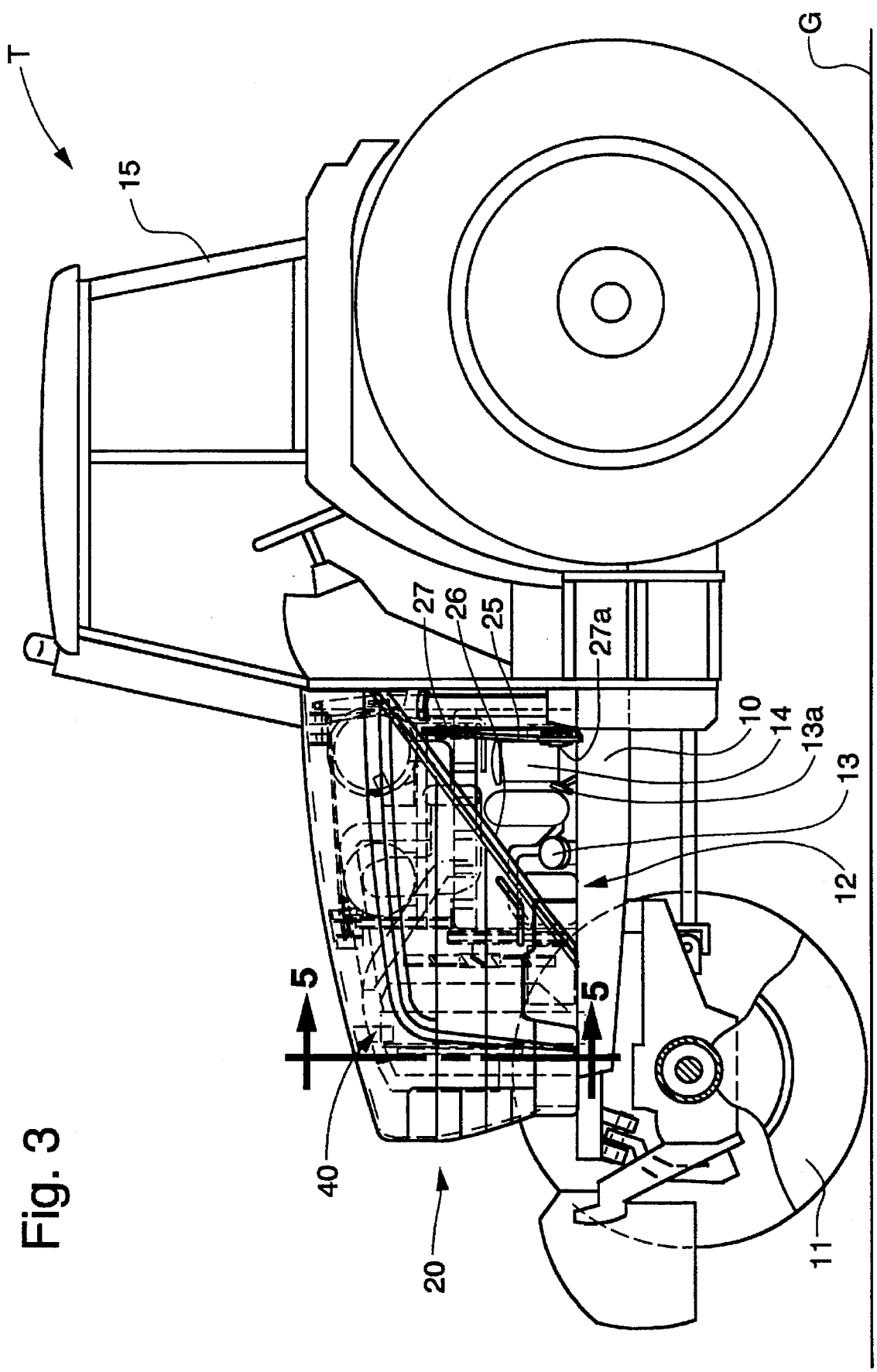
FIG. 3 is a side elevational view of the tractor of FIG. 1 with the hood in the closed position, the left daily access door being opened for access to the engine compartment.
Figure 4:
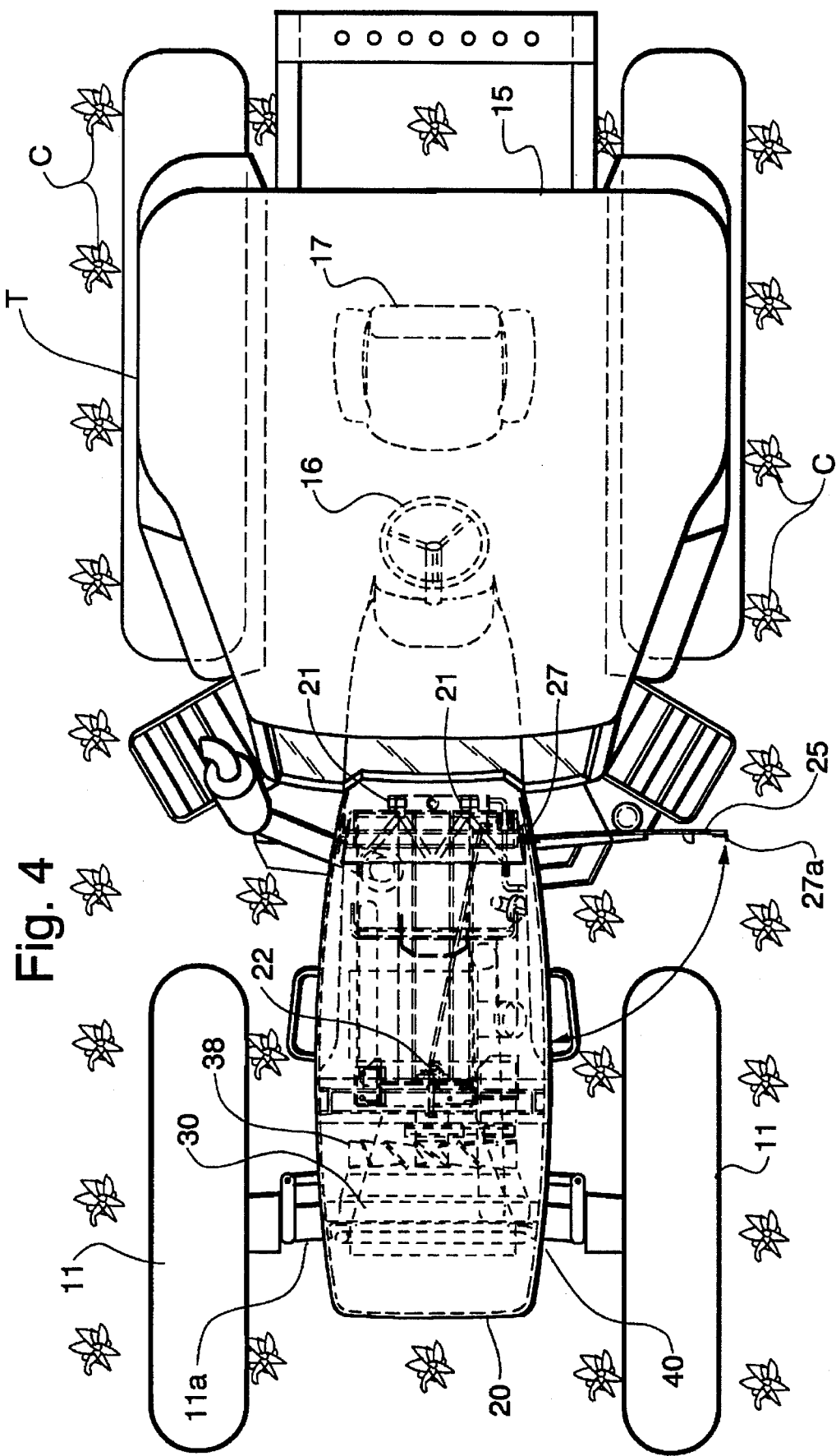
FIG. 4 is a top plan view of the tractor on FIG. 2 working in row crops, the left daily access door being pivoted to the open position.
Figure 8:
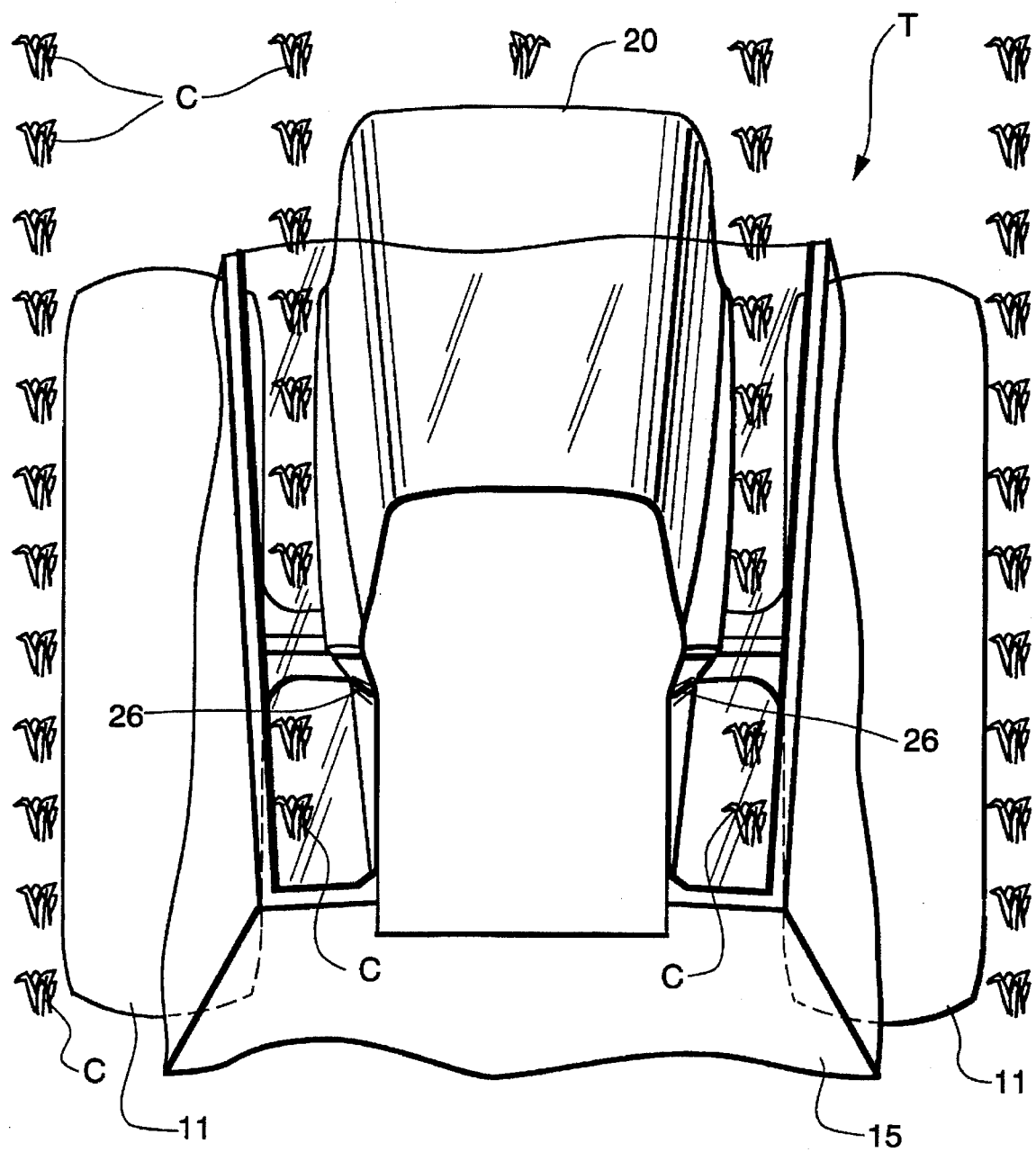
FIG. 8 is a partial cross-sectional view taken along lines 8—8 of FIG. 2 looking down the operator sight line toward the ground.

As best seen in FIGS. 2, 4 and 8, the operator P sitting in the operator's seat 17 has a view of the ground G adjacent the inboard side of the front wheels 11 through the lower front portion of the cab 15, the limits of which are defined by upper and lower sight lines 28, 29 created by the structural confines of the cab 15 and the front axle 11a. This view of the ground G allows the operator P to determine the relationship between his front wheels 11 and the row crops C. One skilled in the art will recognize that this view of the ground G would preferably be enhanced by restricting the adjacent width of the hood 20 and, thereby, provide a wider view of the row crop C. Unfortunately, the hood 20 must be wider than the minimum width necessary to provide a full view of the row crop C because of the lateral width of the engine 12.

Splitting the hood structure 20 along a line of partition 26 corresponding to the upper sight line 28 to separate the hood 20 from the daily access door 25, allows the hood 20 to be sufficiently wide to clear the engine 12, yet minimize the lateral separation of the opposing left and right daily access doors 25. As best seen in FIG. 8, the transversely narrow area of the hood enclosure 20 corresponding to the daily access doors 25 widens and enhances the view of the ground G available to the operator P. The primary hood structure 20a, which moves about the hinge mechanism 21, can be formed as wide as necessary to clear the engine 12 without detracting from the operator's view of the ground G.

The splitting of the hood 20 along the line of partition 26 also enables the primary hood structure 20a to be pivoted through a lesser angular rotation to enable the primary hood structure 20 to completely clear the engine compartment for full access to the engine 12, than if the portion of the hood 20 corresponding to the daily access doors 25 were also pivotally moved about the hinge 21 with the remainder of the hood structure 20a. Since the line of partition extends diagonally at approximately 45° to horizontal, the hood 20 needs only to rotate angularly about 45° to expose the engine 12 fully, as best seen in FIG. 1. The entire engine compartment can be opened for servicing of the engine 12 by rotating the primary hood structure 20a and opening the corresponding daily access door 25.

Figure 7:
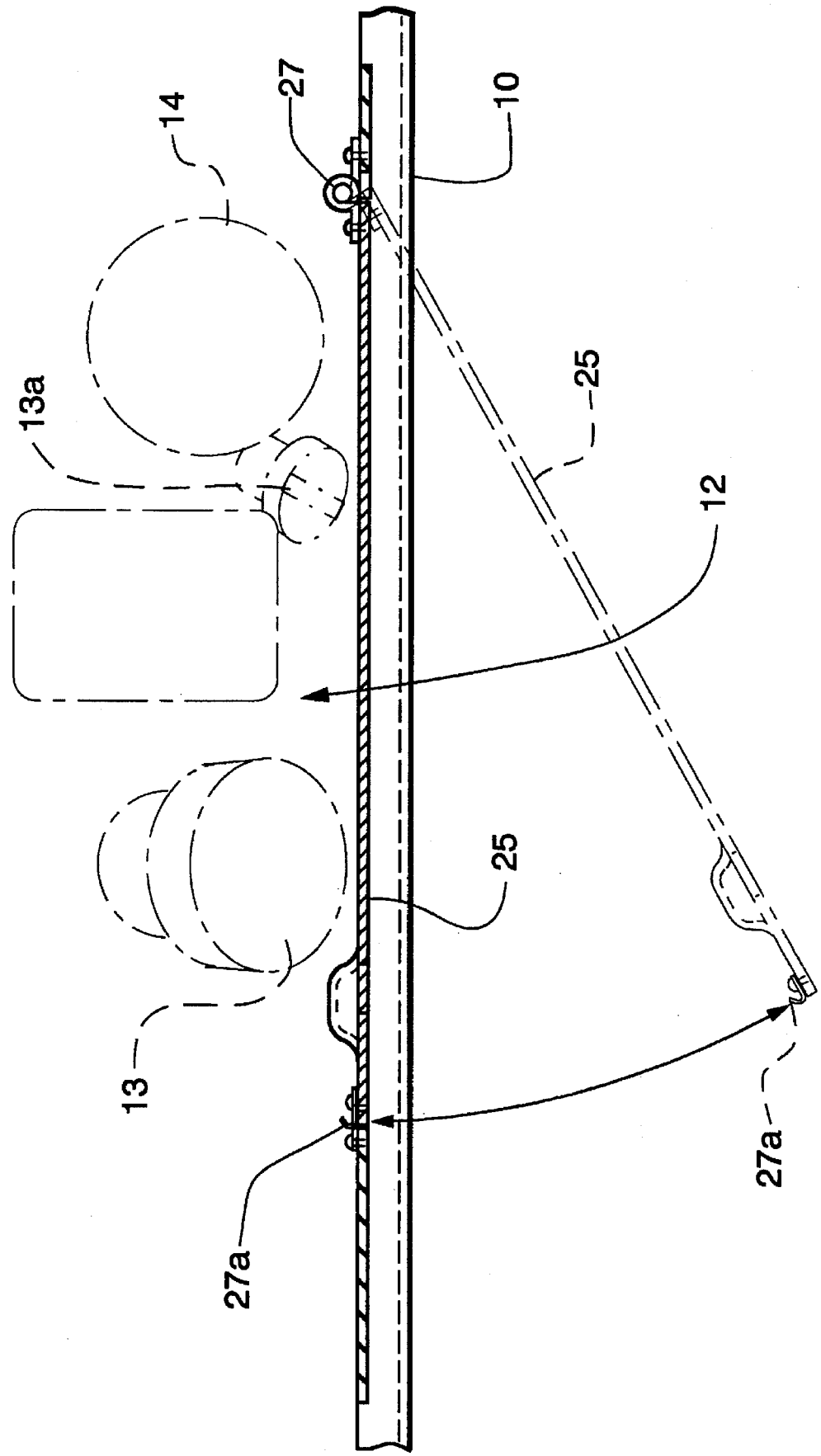
FIG. 7 is a partial cross-sectional view of the tractor taken along lines 7—7 of FIG. 1 to show the details of the daily access door, the movement of the daily access door toward the opened position being shown in phantom, the representative daily service items of the engine accessible through the daily access door also being shown in phantom.

The daily access doors 25, which are located on opposing sides of the tractor T, are pivotally supported by a hinge 27 carried by the chassis 10 to permit an outward opening of the doors 25. A simple spring latch 27a restrains the doors 25 in their closed positions. Once opened, as best seen in FIGS. 2 and 7, the doors 25 allow a limited access to the engine 12. The components of the engine 12 corresponding to frequent maintenance or service needs, such as the filler tube 13 for the oil reservoir, the oil dip stick 13a, or filters 14, are immediately accessible through the left door 25, while other such servicing items can be accessed through the right door 25.

For proper engine cooling, the hot air generated from the operation of the engine 12 cannot be permitted to re-circulate around the radiator 30 to pass back through the radiator 30, which is operable to cool the engine fluids in a conventional manner. Seals are typically provided between the hood 20 and the radiator 30 to prevent this re-circulation of hot air; however, conventional seals would not be effective with a hood structure 20 that raises vertically as the closing operation against the seals causes a lot of wear, compression cycles and torsional forces tending to peel the seals from their conventional adhesive mounting.

To operate properly, the sealing apparatus 40 provided between the hood 20 and the radiator 30 includes a closed cell foam top seal 42 compressible against the top of the radiator 30 when the hood 20 is pivoted to the closed position, flapper seals 45 to seal the gap between the lateral sides of the radiator 30 and the hood 20, and a bottom rubber seal 49 carried by the bottom edge of the hood 20 to compress against the chassis 10 when the hood 20 is closed.

Figure 5:
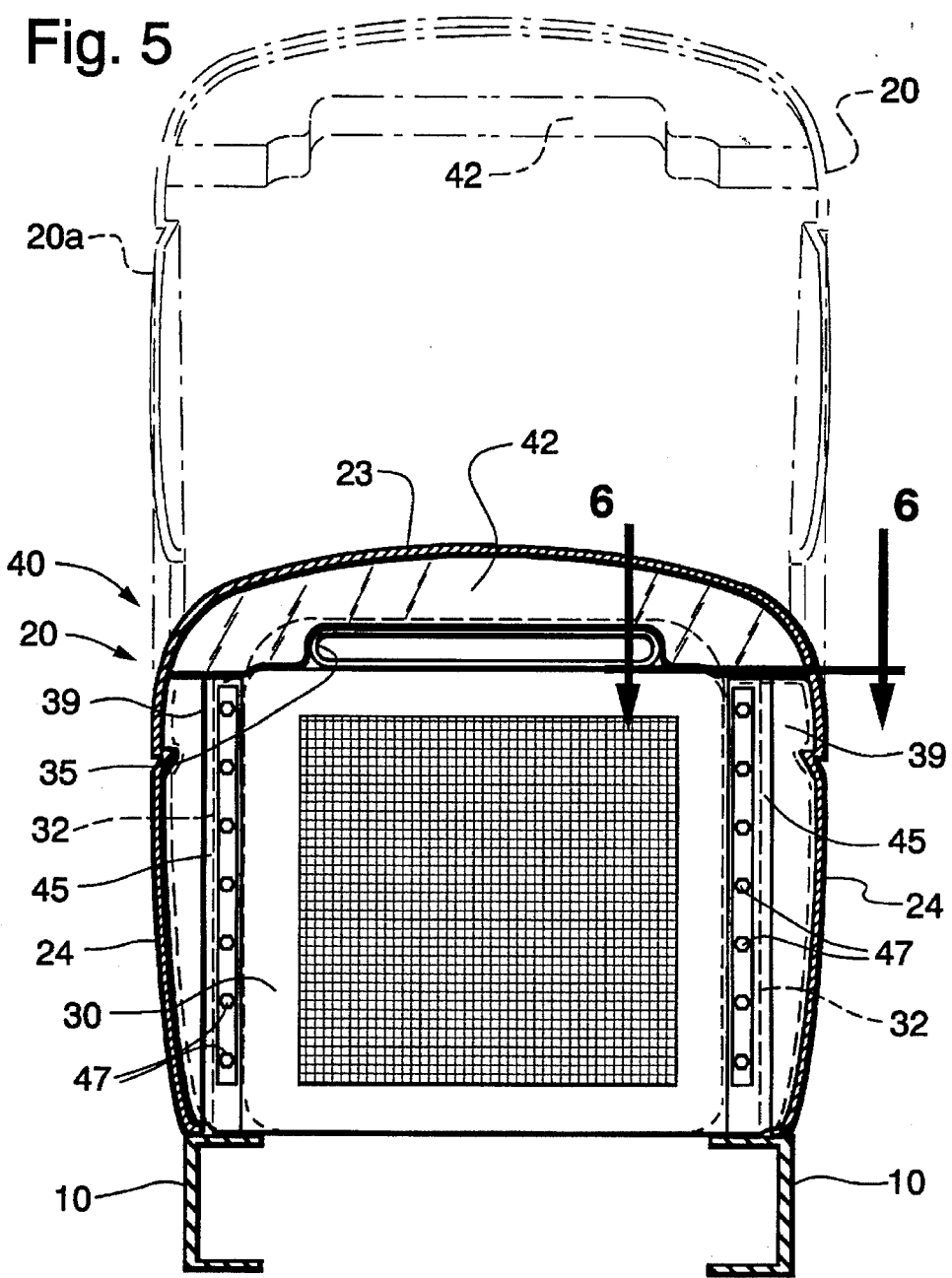
FIG. 5 is a cross-sectional view taken along lines 5—5 of FIG. 3 to depict the details of the radiator sealing apparatus, the opened position of the hood member being shown in phantom.
Figure 6:
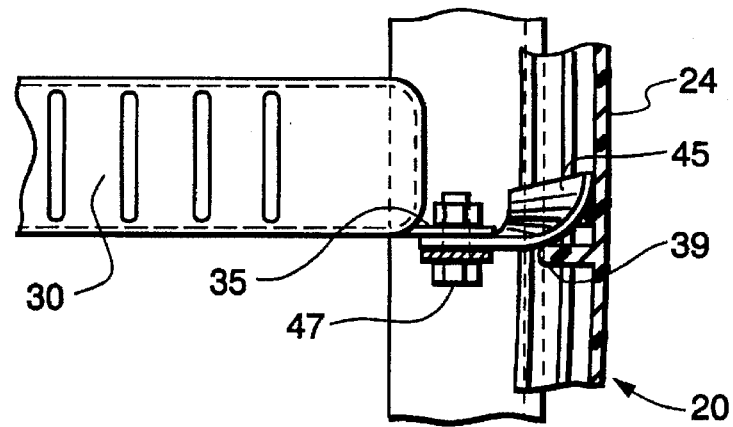
FIG. 6 is an enlarged detail cross-sectional view of the radiator side seal taken along lines 6—6 of FIG. 5, a portion of the hood structure engageable with the radiator side seal being depicted.

The top seal 42 is formed of soft closed cell foam and is attached to the underside of the top portion 23 of the hood 20 with pressure sensitive adhesive. As best depicted in FIG. 5, the top surface of the radiator 30 does not have a regular surface as the air scoop 35 for drawing cool combustion air into the engine 12 is fixed to the top of the radiator 30. Various configurations of inlet and out hoses (not shown) can also provide irregular surfaces against which the top seal 42 must mate for properly sealing the gap between the top of the radiator 30 and the top portion 23 of the hood 20.

Accordingly, the top seal 42 is wire cut to define a surface configuration that matches precisely the irregular top surface of the radiator 30 and other structure, such as the air scoop 35, that is situated between the radiator 30 and the top portion 23. Since the hood 20 moves generally vertically while being pivoted about the hinge mechanism 21 between the opened and closed positions, the engagement between the top seal 42 and the radiator 30 and associated structure results in pure compression of the top seal 42. As a result, the top seal 42 is not subjected to "peel forces" tending to separate the adhesive mounting to the underside of the top portion 23.

Closed cell foam is generally able to withstand continuous temperatures to about 225°. Since the inlet line of the radiator 30 is much hotter than the outlet line of the radiator 30, e.g. temperatures in the range of 320° versus about 170° as the outlet line, a special silicone seal (not shown) can be placed over the inlet line to deflect this excessive heat away from the top seal 42. The wire cutting of the top seal 42 allows the contour of the top seal 42 to be matched very closely with the configuration of the structure against which the seal 42 compresses.

The softness of the closed cell foam allows the compression of the top seal 42 to be easily attained so that the force required to effect closure of the hood 20 and engagement of the latching mechanism 22 is within acceptable limits. For ease of installation, the underside of the top portion 23 of the hood 20 is formed with a roughened surface at the point of attachment of the top seal 42 to aid in the bonding of the adhesive. Small raised points (not shown) can be located on the underside of the top portion of the hood 20 to define the perimeter limits of the attachment area for properly locating the top seal 42.

The side flapper seals 45 comprise two separate, identical seal members fastened, respectively, to the opposing lateral sides of the radiator 30. Since the seal members are substantially identical, except being mounted in reverse to each other, the description of one of the seal members will be sufficient for the entire side seal structure. The side flapper seal 45 is constructed of a strip of resilient sealing material, such as rubber, fastened in a detachable manner by a series of vertically spaced fasteners 47 to the superstructure of the radiator 30. To facilitate assembly of the side seals 45, the radiator 30 is preferably constructed with a side mounting flange 32 to which the fasteners 47 mount the side seal 45.

Since the hinge mechanism 21 is mounted at the upper, rearward portion of the hood 20 against the operator's cab 15, the motion of the primary hood structure 20a when moved into the closed position corresponds to the lower quadrant of the arcuate movement of the hood 20 about the hinge 21. In other words, the actual motion of the primary hood structure 20 just before reaching the closed position is downward toward the chassis 10 and slightly rearwardly. The result of this rearward component of the pivotal movement of the hood 20 is that ribs 39 formed in the side panels 24 of the hood 20 in a generally vertical manner on the inside of the hood 20 compress rearwardly against the side flapper seals 45 to effect a rearward deflection of the flapper seals 45.

Since the resilient side seals 45 are deflected, the internal spring forces within the seal material urges the seals 45 against the ribs 39 and prevent the passage of heated engine compartment air forwardly past the radiator 30. Furthermore, the operation of the conventional engine fan 38 to draw air through the radiator 30 to cool the engine fluids circulating therethrough creates an air pressure differential with the negative side of the pressure differential being forwardly of the radiator. This negative pressure differential typically draws heated engine compartment air forwardly around the radiator 30 to be re-circulated through the radiator 30; however, the side seal 45 configuration described above operates to further draw the side seal 45 against the rib 39 and enhance the effective operation of the side seals 45.

The use of non-foam, solid rubber side seals 45, which are preferably 5 mm thick and 50 mm wide to span the gap between the radiator mounting flange 32 and the side panels 24, provides a resilient, chemical resistent and wear resistent side seal 45 structure that is less prone to damage than conventional foam seals. The use of fasteners 47 to mount the side seals 45 provides a very secure mounting of the seals 45, yet allows them to be easily removed from the tractor T in the event damage does occur for a simple replacement thereof.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a chassis adapted for movement over ground by laterally spaced front and rear ground-engaging wheels; an operator's station mounted on said chassis and having an operator's seat from which a sight line is defined from a position at which an operator sits in said operator's seat along a line to a position of engagement between said front wheels and the ground; an engine mounted on said chassis to provide operative power therefor; and an engine hood mounted relative to said chassis for movement between a closed position in which said engine is inaccessibly covered and an opened position in which said engine is accessible, an improved engine hood comprising:

a primary hood member pivotally mounted relative to said chassis by a hinge mechanism defining a generally horizontal, transverse pivot axis about which said primary hood member is pivotally movable between said opened and closed positions above a line of partition substantially coinciding with said sight line; and a fixed hood portion separated from said primary hood member along said line of partition and being located below said line of partition.

2. The tractor of claim 1 wherein said primary hood member and said fixed hood portion have lateral widths defining, respectively, opposing sides thereof, the lateral width of said primary hood member being greater than said fixed hood portion.

3. The tractor of claim 1 wherein said fixed hood portion includes at least one daily access door pivotally mounted on said chassis for movement between a closed position and an opened position.

4. The tractor of claim 3 wherein said engine includes components requiring frequent service attention, said components being accessible through said daily access door when moved to said opened position while said primary hood member remains in said closed position.

5. The tractor of claim 4 wherein said daily access door is generally triangularly-shaped, one said daily access door is provided on each opposing side of said tractor.

6. The tractor of claim 5 wherein each of said daily access doors and said primary hood member are independently movable.

7. An engine hood enclosure for a tractor having a chassis adapted for movement over ground by laterally spaced front and rear ground-engaging wheels; an operator's station mounted on said chassis and having an operator's seat from which a sight line is defined from a position at which an operator sits in said operator's seat along a line to a position of engagement between said front wheels and the ground; and an engine mounted on said chassis to provide operative power therefor, comprising:

a primary hood member pivotally mounted relative to said chassis by a hinge mechanism defining a generally horizontal, transverse pivot axis about which said primary hood member is pivotally movable between a closed position in which said engine is inaccessibly covered and an opened position in which said engine is accessible; and a fixed hood portion separated from said primary hood member along a line of partition substantially coinciding with said sight line, said primary hood member being located above said line of partition and said fixed hood portion being located below said line of partition, said fixed hood portion having opposing lateral sides;

said fixed hood portion including at least one daily access door movable between a closed position in which said engine is inaccessibly covered and an opened position in which said engine is partially accessible.

8. The engine hood enclosure of claim 7 wherein said engine includes at least one component requiring frequent servicing, said at least one component being accessible through said daily access door.

9. The engine hood enclosure of claim 8 wherein one said daily access door is provided on each opposing side of said said fixed hood portion, said primary hood member and each of said daily access doors being independently movable.

10. The engine hood enclosure of claim 9 wherein said daily access doors are generally triangularly-shaped.

11. The engine hood enclosure of claim 9 wherein said primary hood member has a lateral width greater than the lateral spacing of said opposing daily access doors so that the operator may have greater visibility of the position where said front wheels engage the ground.

12. A tractor comprising:

a chassis adapted for movement over ground by laterally spaced front and rear ground-engaging wheels;

an operator's station mounted on said chassis and having an operator's seat from which a sight line is defined from a position at which an operator sits in said operator's seat along a line to a position of engagement between said front wheels and the ground;

an engine mounted on said chassis to provide operative power therefor; and an engine hood defining laterally opposing sides and being mounted relative to said chassis for movement between a closed position in which said engine is inaccessibly covered and an opened position in which said engine is accessible said engine hood including:

a primary hood member pivotally mounted relative to said chassis by a hinge mechanism defining a generally horizontal, transverse pivot axis about which said primary hood member is pivotally movable between said opened and closed position, said primary hood member defining a straight line of partition angling downwardly to substantially correspond to said line of sight; and at least one triangularly-shaped daily access door located below said line of partition and being movable about a hinge axis between a closed position in which preselected components of said engine are inaccessibly covered and an opened position in which said engine components are accessible, said hinge axis being fixed relative to said chassis, one side of said at least one daily access door being aligned with said line of partition.

13. The tractor of claim 12 wherein one said daily access door is provided on each opposing side of said tractor, said primary hood member and each of said daily access doors being independently movable.

14. The tractor of claim 13 wherein said primary hood member has a lateral width greater than the lateral spacing of said opposing daily access doors so that the operator may have greater visibility of the position where said front wheels engage the ground.

* * * * *